(12) United States Patent
Heike

(10) Patent No.: US 9,821,712 B2
(45) Date of Patent: Nov. 21, 2017

(54) VEHICLE INTERIOR LIGHTING DEVICE

(71) Applicant: Toshiba Lighting & Technology Corporation, Yokosuka-shi, Kanagawa (JP)

(72) Inventor: Atsushi Heike, Kanagawa (JP)

(73) Assignee: Toshiba Lighting & Technology Corporation, Yokosuka-shi (JP)

( * ) Notice: Subject to any disclaimer, the term of this patent is extended or adjusted under 35 U.S.C. 154(b) by 0 days.

(21) Appl. No.: 15/191,638

(22) Filed: Jun. 24, 2016

(65) Prior Publication Data

US 2016/0375824 A1    Dec. 29, 2016

(30) Foreign Application Priority Data

Jun. 26, 2015   (JP) ................................. 2015-128536
Apr. 26, 2016   (JP) ................................. 2016-088042

(51) Int. Cl.
| B60Q 1/00 | (2006.01) |
| F21V 21/28 | (2006.01) |
| F21V 21/29 | (2006.01) |
| B60Q 3/74 | (2017.01) |
| B60Q 3/82 | (2017.01) |

(52) U.S. Cl.
CPC ....... *B60Q 3/74* (2017.02); *B60Q 3/82* (2017.02)

(58) Field of Classification Search
CPC .................................... B60Q 3/74; B60Q 3/82
See application file for complete search history.

(56) References Cited

U.S. PATENT DOCUMENTS

| 6,587,573 | B1* | 7/2003 | Stam | B60Q 1/085 340/930 |
| 2002/0140215 | A1* | 10/2002 | Breed | G01F 23/0076 280/735 |
| 2002/0159270 | A1* | 10/2002 | Lynam | B60Q 1/2607 362/487 |
| 2003/0209893 | A1* | 11/2003 | Breed | B60J 10/00 280/735 |
| 2006/0044800 | A1* | 3/2006 | Reime | H05B 33/0803 362/276 |
| 2007/0124028 | A1* | 5/2007 | Okubo | H04B 3/548 701/1 |
| 2014/0177393 | A1* | 6/2014 | Menne | G01S 15/00 367/89 |
| 2014/0309813 | A1* | 10/2014 | Ricci | B60Q 1/00 701/2 |
| 2015/0138820 | A1* | 5/2015 | Salter | B60Q 3/02 362/510 |

FOREIGN PATENT DOCUMENTS

| JP | 11-123985 | 11/1999 |
| JP | 2004-182012 | 2/2004 |

* cited by examiner

*Primary Examiner* — Donald Raleigh
(74) *Attorney, Agent, or Firm* — Ulmer & Berne LLP

(57) ABSTRACT

A vehicle interior lighting device according to an embodiment includes a housing, a cover provided on one end portion side of the housing, a light-emitting section provided on the inside of the housing, and a detecting section provided on the inside of the housing and configured to detect, via the cover, a change in energy involved in a motion of an operator and convert the detected change in the energy into an electric signal.

15 Claims, 7 Drawing Sheets

VEHICLE INTERIOR LIGHTING DEVICE

CROSS-REFERENCE TO RELATED APPLICATIONS

This application is based upon and claims the benefit of priority from Japanese Patent Application No. 2015-128536, filed on Jun. 26, 2015; No. 2016-088042, filed on Apr. 26, 2016; the entire contents of which are incorporated herein by reference.

FIELD

Embodiments described herein relate to a vehicle interior lighting device.

BACKGROUND

There is a vehicle interior lighting device provided in an interior of an automobile or the like.

In the vehicle interior lighting device, a switch for lighting a light source and switching a lighting mode is provided. As the switch, a push switch or a slide switch is used.

An operator (an occupant or the like of a vehicle) needs to mechanically operate the push switch or the slide switch. In general, the vehicle interior lighting device is operated in a dark environment at night or the like.

Therefore, the operator needs to grope for the switch in the dark environment. This deteriorates the operability of the vehicle interior lighting device.

Therefore, there has been a demand for development of a vehicle interior lighting device having high operability even in a dark environment.

DETAILED DESCRIPTION

Figure 1:
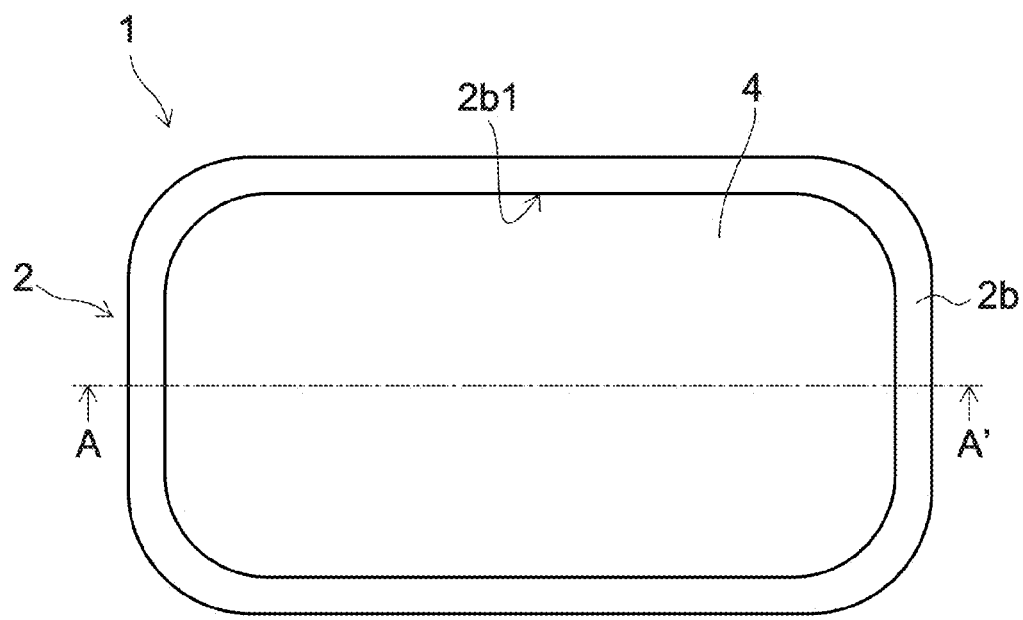
FIG. 1 is a schematic plan view for illustrating a vehicle interior lighting device according to an embodiment.

In general, according to one embodiment, there is provided a vehicle interior lighting device including: a housing; a cover provided on one end portion side of the housing; a light-emitting section provided on the inside of the housing; and a detecting section provided on the inside of the housing and configured to detect, via the cover, a change in energy involved in a motion of an operator and convert the detected change in the energy into an electric signal.

With the vehicle interior lighting device, it is unnecessary to grope for a switch in a dark environment. Therefore, the vehicle interior lighting device has high operability even in the dark environment.

In this case, the detecting section may be not exposed to a surface on the opposite side of the light-emitting section side of the cover.

Therefore, it is possible to increase the area of a radiation surface.

In the case of a general vehicle interior lighting device, a push switch, a slide switch, or the like is exposed on a radiation surface of a cover. Therefore, it is difficult to match design of the vehicle interior lighting device with design of an interior material of a vehicle interior.

According to this embodiment, since an exposed object is absent on the radiation surface of the cover, it is easy to match design of the vehicle interior lighting device with design of an interior material of a vehicle interior.

An embodiment is illustrated below with reference to the drawings. Note that, in the drawings, the same components are denoted by the same reference numerals and signs and detailed explanation of the components is omitted as appropriate.

FIG. 1 is a schematic plan view for illustrating a vehicle interior lighting device 1 according to this embodiment.

Figure 2:
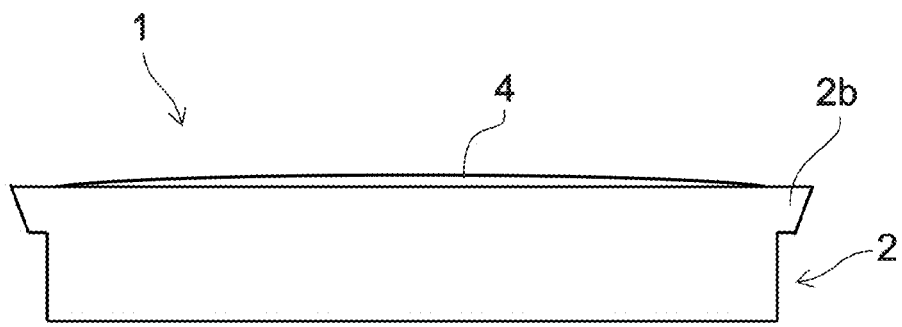
FIG. 2 is a schematic side view of the vehicle interior lighting device.

FIG. 2 is a schematic side view of the vehicle interior lighting device 1.

Figure 3:
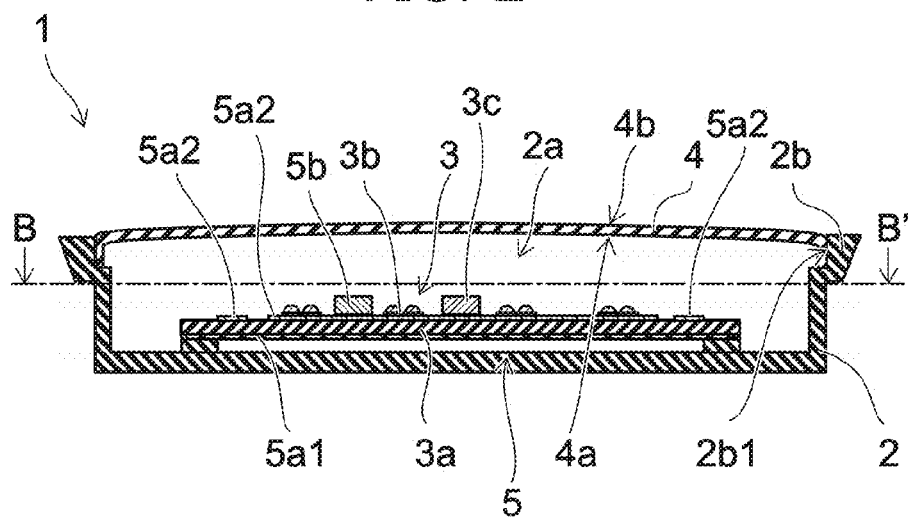
FIG. 3 is a schematic sectional view of the vehicle interior lighting device.

FIG. 3 is a schematic sectional view of the vehicle interior lighting device 1.

Note that FIG. 3 is a schematic sectional view in an A-A' line direction in FIG. 1.

The vehicle interior lighting device 1 can be provided in, for example, an opening provided on a ceiling surface, a sidewall surface, or the like in an interior of an automobile.

As shown in FIGS. 1 to 3, a housing 2, a light-emitting section 3, a cover 4, and a detecting section 5 are provided in the vehicle interior lighting device 1.

The housing 2 assumes a box shape. One end portion 2a of the housing 2 is opened. At the end portion 2a of the housing 2, a flange section 2b projecting in the outward direction of the housing 2 is provided. The plane shape of the flange section 2b assumes an annular shape. A recessed section 2b1 is provided on the inner edge side of the flange section 2b.

The material of the housing 2 is not particularly limited. The housing 2 can be formed using, for example, a resin material or a metal material.

In this case, if the material of the housing 2 is a material having high reflectance for light radiated from a light source 3b, the light reflected on the inner surface of the housing 2 is easily extracted to the outside of the vehicle interior lighting device 1.

As the material having high reflectance, for example, white resin and resin mixed with particles of titanium oxide or the like can be illustrated.

When a heat value of the light source 3b or the like is large, the material of the housing 2 is desirably a material having high heat conductivity.

As the material having high heat conductivity, for example, high heat conductivity resin, metal, and ceramics such as aluminum oxide and aluminum nitride can be illustrated.

Note that the high heat conductivity resin is obtained by, for example, mixing fibers or particles made of carbon, aluminum oxide, or the like having high heat conductivity in resin of PET (Polyethylene terephthalate) or nylon.

The light-emitting section 3 is provided on the inside of the housing 2.

In the light-emitting section 3, a substrate 3a, the light source 3b, and a control section 3c are provided.

The substrate 3a assumes a tabular shape. A not-shown wiring pattern is provided on the surface of the substrate 3a.

The substrate 3a can be formed of, for example, ceramics such as aluminum oxide or aluminum nitride or an organic material such as paper phenol or glass epoxy.

When a heat value of the light source 3b or the like is large, it is desirable to form the substrate 3a using a material having high heat conductivity from the viewpoint of thermal radiation. As the material having high heat conductivity, for example, ceramics such as aluminum oxide and aluminum nitride and the high heat conductivity resin explained above can be illustrated.

The substrate 3a may be a single layer or may be a multilayer.

One end of a not-shown power feed terminal is electrically connected to the wiring pattern provided on the substrate 3a. The other end of the power feed terminal is exposed from the housing 2. An external power supply or the like is electrically connected to, via a not-shown socket or the like, the power feed terminal exposed from the housing 2.

The light source 3b is provided on the substrate 3a. The light source 3b is electrically connected to the wiring pattern provided on the substrate 3a.

The light source 3b can be, for example, a light-emitting element such as a light-emitting diode, a laser diode, or an organic light-emitting diode, a filament lamp (an incandescent lamp), or a fluorescent lamp.

The number of light sources 3b is not particularly limited. The number of light sources 3b can be changed as appropriate according to a use, size, and the like of the vehicle interior lighting device 1. That is, the number of light sources 3b only has to be one or more.

When a plurality of light sources 3b are provided, the arrangement of the plurality of light sources 3b may be regular arrangement such as a matrix shape or a concentric shape or may be any arrangement.

When the plurality of light sources 3b are provided, it is possible to provide a plurality of kinds of light sources 3b having different colors of lights to be radiated. If the plurality of kinds of light sources 3b having the different colors of lights to be radiated are provided, it is possible to perform toning explained below.

For example, when the light source 3b is the light-emitting diode, it is possible to radiate light having a desired color from the light source 3b by selecting a phosphor.

Note that it is also possible to radiate light having a desired color from the light source 3b by providing a toning filter or the like.

A connection method for the light source 3b and the wiring pattern provided on the substrate 3a is not particularly limited.

When the light source 3b is the light-emitting element, the light source 3b can be electrically connected to the wiring pattern via, for example, a wire. The light source 3b may be implemented by, for example, a COB (Chip On Board) directly connected to the wiring pattern.

The light source 3b can also be electrically connected to the wiring pattern via an envelope like, for example, a PLCC (Plastic Leaded Chip Carrier) type.

It is also possible to, according to necessity, provide an annular reflector that surrounds the light source 3b, seal the light source 3b with resin, or include a phosphor in the resin for sealing the light source 3b.

When the light source 3b is the filament lamp, the fluorescent lamp, or the like, for example, the light source 3b may be soldered to the wiring pattern or may be electrically connected to the wring pattern via a socket or the like.

The control section 3c is provided on the substrate 3a. The control section 3c is electrically connected to the wiring pattern provided on the substrate 3a.

For example, the control section 3c lights the light source 3b, extinguishes the light source 3b, controls a light-emitting state of the light source 3b, and switches a lighting mode of the light source 3b on the basis of an electric signal from the detecting section 5.

The control of the light source 3b is to, for example, change brightness (dimming), change a color of light (toning), and select the light source 3b to be lit or extinguished among the plurality of light sources 3b (a change of a lighting pattern).

The switching of the lighting mode of the light source 3b is to, for example, switch an ON Mode for lighting the light source 3b, an OFF mode for extinguishing the light source 3b, and a DOOR mode for lighting the light source 3b when a door of a vehicle is in an open state and extinguishing the light source 3b when the door of the vehicle is in a closed state.

In this case, the control section 3c can set an amount of light at the time when the door of the vehicle is in the closed state in the DOOR mode to be ½ or less, ⅕ or less, ¹⁄₁₀ or less, or ¹⁄₁₀₀ or less of an amount of light at the time when the door of the vehicle is in the open state.

The control section 3c can also set the amount of light in the closed state of the door of the vehicle in the DOOR mode to be ½ or less, ⅕ or less, ¹⁄₁₀ or less, or ¹⁄₁₀₀ or less of an amount of light in the ON mode.

The control section 3c can also control the plurality of light sources 3b to differentiate a lighting pattern in the ON mode and a lighting pattern in the DOOR mode.

That is, the control section 3c performs, on the basis of an electric signal from the detecting section 5, at least any one of, for example, lighting of the light source 3b, extinction of the light source 3b, dimming of the light source 3b, toning of the light source 3b, a change of a lighting pattern of the light source 3b, and switching of a lighting mode of the light source 3b.

Note that a relation between the electric signal from the detecting section 5 and content of the control can be set in advance according to a use or the like of the vehicle interior lighting device 1.

The control section 3c can be, for example, a control circuit including circuit components such as a resistor, a capacitor, and an integrated circuit.

In this case, the control circuit only has to be configured taking into account the relation between the electric signal from the detecting section 5 and the content of the control.

The control section 3c can also include, for example, an arithmetic element and a storage element and cause the arithmetic element to operate with software stored in the storage element.

In this case, the relation between the electric signal from the detecting section 5 and the content of the control can be stored in the storage element.

The cover 4 is provided on one end portion 2a side of the housing 2.

The cover 4 is provided to cover an opening (the end portion 2a) of the housing 2. The cover 4 is retained on the inside of the recessed section 2b1. In this case, it is possible to retain the cover 4 on the inside of the recessed section 2b1 by fitting the cover 4 in the recessed section 2b1. It is also possible to provide a not-shown claw section or the like in the cover 4 or the recessed section 2b1 and retain the cover 4 on the inside of the recessed section 2b1 with the claw section or the like.

The peripheral edge of the cover 4 projects toward the light-emitting section 3 side. If the peripheral edge of the cover 4 is projected, it is possible to increase the strength of the cover 4. Further, it is easy to retain the cover 4 in the recessed section 2b1.

The cover 4 has a curved surface shape convex on the center side.

Note that the shape and a retaining method of the cover 4 are not limited to the shape and the retaining method illustrated above and can be changed as appropriate according to a use and size of the vehicle interior lighting device 1, design of an interior material in the vehicle interior, and the like.

The material of the cover 4 is not particularly limited. However, for example, the cover 4 can be formed of resin, glass, or the like having translucency.

Although the cover 4 has translucency, the cover 4 needs to suppress glare. Therefore, the light transmittance of the cover 4 is set low to reduce the intensity of radiated light.

The light transmittance is set low by, for example, applying diffusing treatment such as blasting to at least one of an incident surface 4a and a radiation surface 4b of the cover 4 or providing a scattering layer including a scattering material in at least one of the incident surface 4a and the radiation surface 4b of the cover 4.

It is also possible to set the light transmittance low by forming the cover 4 from a translucent material including a scattering material.

The scattering material can be, for example, particulates having a refractive index different from the refractive index of the translucent material. The particulates can be made of, for example, titanium oxide.

In this case, if the linear transmittance of light in the cover 4 is set to 60% or less, it is possible to effectively suppress glare.

If the linear transmittance of light in the cover 4 is set to 30% or more and 50% or less, it is possible to more effectively suppress glare without spoiling functions of the vehicle interior lighting device 1.

It is also possible to provide optical elements such as a lens and a prism in the cover 4 according to a use and the like of the vehicle interior lighting device 1.

The detecting section 5 is provided on the inside of the housing 2. The detecting section 5 is not exposed to the radiation surface 4b of the cover 4. Therefore, it is possible to increase the area of the radiation surface 4b.

That is, according to this embodiment, it is possible to increase a light radiation area.

In the case of the general vehicle interior lighting device, the push switch, the slide switch, or the like is exposed on the radiation surface of the cover. Therefore, it is difficult to match the design of the vehicle interior lighting device with the design of the interior material in the vehicle interior.

According to this embodiment, since an exposed object is absent on the radiation surface 4b of the cover 4, it is easy to match the design of the vehicle interior lighting device 1 with the design of the interior material in the vehicle interior.

In this case, by changing a color and a decoration of the cover 4, it is easier to match the design of the vehicle interior lighting device 1 with the design of the interior material in the vehicle interior.

The detecting section 5 detects a motion of an operator (an occupant or the like of the vehicle) near the vehicle interior lighting device 1.

The detecting section 5 detects, for example, a motion of a detection target (e.g., a hand 110 of the operator) near the vehicle interior lighting device 1.

The detecting section 5 emits energy (an electric field) functioning as a detection medium via the cover 4, detects a change in the energy (a change in electric field intensity) involved in the motion of the operator, converts the detected change in the energy (change in the electric field intensity) into an electric signal, and sends the electric signal to the control section 3c.

For example, the detecting section 5 can generate an electric field and convert a change in the electric field involved in a motion of the operator within the generated electric field into an electric signal.

Note that, if the electric field changes, capacitance also changes. That is, the change in the electric field can be considered the same as the change in the capacitance.

Therefore, for example, the detecting section 5 can also generate an electric field, detect a change in capacitance involved in a motion of the operator within the generated electric field, and convert the detected change in the capacitance into an electric signal.

As shown in FIG. 3, an electrode section 5a and a control section 5b are provided in the detecting section 5.

Figure 4A:
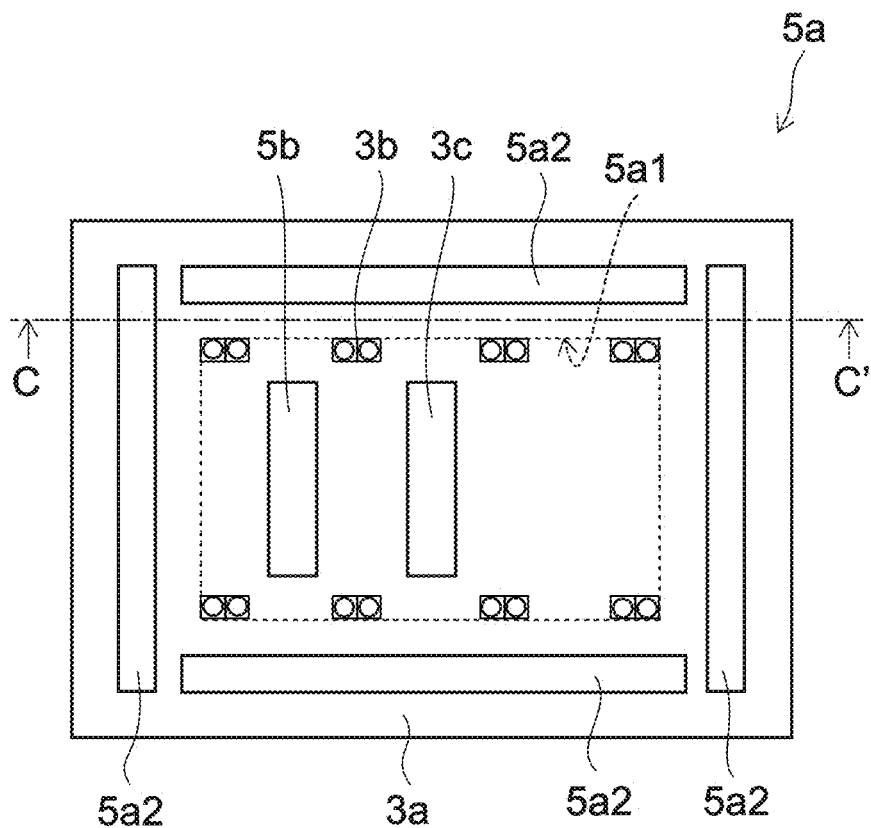
FIG. 4A is a schematic plan view for illustrating an electrode section.

FIG. 4A is a schematic plan view for illustrating the electrode section 5a.

FIG. 4A is a schematic plan view in a B-B' line direction in FIG. 3.

Figure 4B:
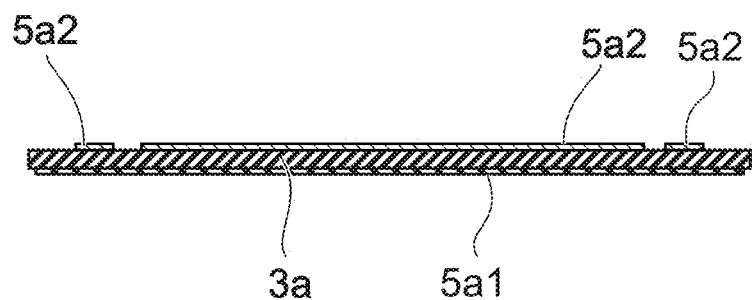
FIG. 4B is a schematic sectional view for illustrating the electrode section.

FIG. 4B is a schematic sectional view for illustrating the electrode section 5a.

Note that FIG. 4B is a schematic sectional view in a C-C' line direction in FIG. 4A.

As shown in FIGS. 4A and 4B, a first electrode section 5a1 and second electrode sections 5a2 are provided in the electrode section 5a.

The first electrode section 5a1 is provided on a surface on the opposite side of the cover 4 side of the substrate 3a. The first electrode section 5a1 is provided near the peripheral edge of the substrate 3a. The first electrode section 5a1 assumes a frame shape. The first electrode section 5a1 is formed of a conductive material. The first electrode section 5a1 can be formed of metal such as copper. The width dimension of the first electrode section 5a1 can be set longer than the width dimension of the second electrode sections 5a2.

The second electrode sections 5a2 are provided on a surface on the cover 4 side of the substrate 3a. The second electrode sections 5a2 are provided near the peripheral edge of the substrate 3a.

The number of second electrode sections 5a2 can be set to one or more.

In this case, if the number of second electrode sections 5a2 is set large, it is possible to detect details of a motion of the operator. However, if a dimension among the second electrode sections 5a2 is too short, erroneous detection is caused.

Therefore, when the size of the vehicle-interior lighting device 1 is taken into account, the number of second electrode sections 5a2 is desirably set to one or more and five or less.

Note that, in FIGS. 4A and 4B, four second electrode sections 5a2 are provided.

As shown in FIG. 4A, when the four second electrode sections 5a2 are provided, the second electrode sections 5a2 can be provided in four directions to surround the center of the substrate 3a.

For example, as shown in FIG. 4A, the second electrode sections 5a2 can be provided one by one in the four directions viewed from the center of the substrate 3a.

In this case, the plane shape of the substrate 3a can be formed in a square shape. The second electrode sections 5a2 can be provided one by one near the sides of the substrate 3a.

Note that, when five second electrode sections 5a2 are provided, one second electrode section 5a2 can be further provided in the center of the substrate 3a.

When three or two second electrode sections 5a2 are provided, any one(s) of the four second electrode sections 5a2 only has (have) to be not provided.

When one second electrode section 5a2 is provided, the second electrode section 5a2 can be provided in any position of the substrate 3a.

The plane shape of the second electrode section 5a2 can be formed in, for example, a linear shape. In this case, the plane shape of the second electrode sections 5a2 can be formed in a straight line shape as illustrated in FIG. 4A or can be formed in a curved line shape.

Note that the second electrode section 5a2 may be formed by a plurality of dot-like portions or a plurality of island-like portions. The second electrode section 5a2 is formed of a conductive material. The second electrode section 5a2 can be formed of metal such as copper.

A not-shown base section for insulating the first electrode section 5a1 and the second electrode section 5a2 can be further provided. The base section can assume, for example, a film shape. The base section can be formed of, for example, a resin film.

The base section can be provided on, for example, the surface on the cover 4 side of the substrate 3a or the surface on the opposite side of the cover 4 side of the substrate 3a. However, the base section only has to be disposed in a position where the base section can insulate the first electrode section 5a1 and the second electrode section 5a2. A disposed position of the base section is not particularly limited.

The base section may be a single layer structure or a multilayer structure.

The control section 5b is provided on the surface of the cover 4 side of the substrate 3a.

The control section 5b is electrically connected to the first electrode section 5a1 and the second electrode section 5a2. When a plurality of second electrode sections 5a2 are provided, each of the plurality of second electrode sections 5a2 is electrically connected to the control section 5b.

The control section 5b can be a control circuit including circuit components such as a resistor, a capacitor, and an integrated circuit or can include an arithmetic element and a storage element and cause the arithmetic element to operate with software stored in the storage element.

Note that functions of the control section 5b can be imparted to the control section 3c.

Figure 5:
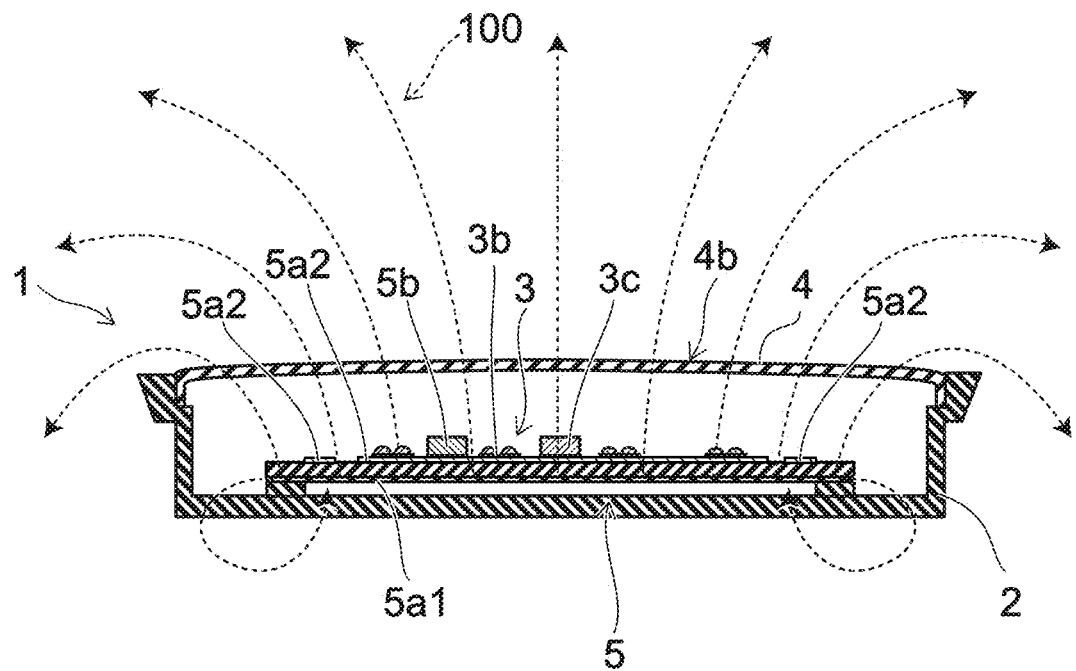
FIG. 5 is a schematic diagram for illustrating action of a detecting section.
Figure 6:
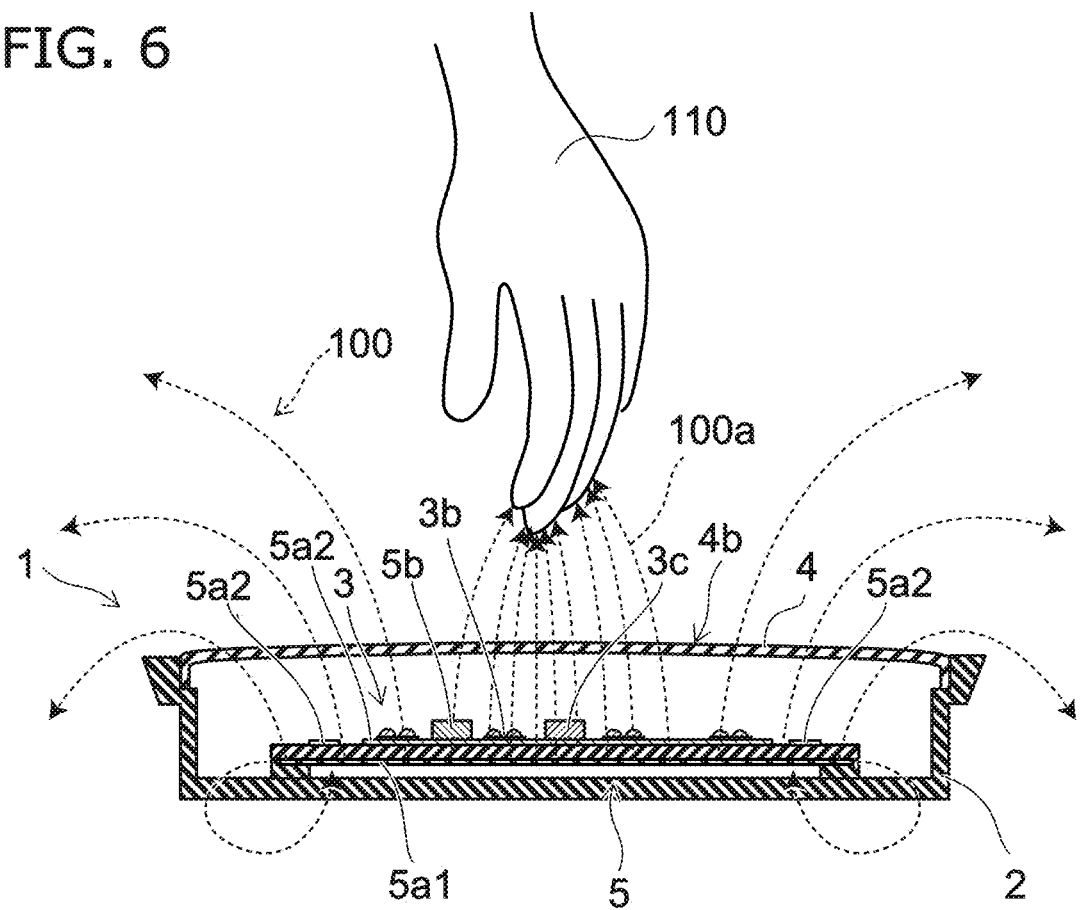
FIG. 6 is a schematic diagram for illustrating the action of the detecting section.

FIGS. 5 and 6 are schematic diagrams for illustrating action of the detecting section 5.

First, the control section 5b applies a low-frequency AC voltage to the first electrode section 5a1 and the second electrode section 5a2. In this case, the frequency can be set to approximately 100 kHz. If the frequency is set to approximately 100 kHz, a wavelength is approximately 3 km. The external dimension of the first electrode section 5a1 and the second electrode sections 5a2 is approximately 10 cm. When the wavelength is sufficiently longer than the external dimension of the first electrode section 5a1 and the second electrode sections 5a2, a magnetic field component is hardly generated.

Therefore, as shown in FIG. 5, a substantially static electric field 100 is generated near the vehicle interior lighting device 1.

As shown in FIG. 6, when a hand 110 or the like of the operator enters the inside of the generated electric field 100, lines of electric force 100a are attracted to the hand 110 or the like. Therefore, a disturbance of the electric field 100 occurs near the hand 110 or the like.

Therefore, the control section 5b calculates a position where the disturbance of the electric field 100 occurs and detects the position of the hand 110 or the like in a direction parallel to the radiation surface 4b. In this case, the control section 5b can also calculate the distance between the vehicle interior lighting device 1 and the hand 110 or the like (the position of the hand 110 or the like in a direction perpendicular to the radiation surface 4b), and the moving direction, the speed, and the like of the hand 110 or the like.

The position where the disturbance of the electric field 100 occurs (the position of the hand 110 or the like) can be calculated according to the positions of the second electrode sections 5a2 and a change in electric field intensity in the second electrode sections 5a2. The distance between the vehicle interior lighting device 1 and the hand 110 or the like can be calculated according to a value of the electric field intensity in the second electrode sections 5a2. The moving direction, the speed, and the like of the hand 110 or the like can also be calculated according to the positions of the second electrode sections 5a2 and the change in the electric field in the second electrode sections 5a2.

Note that the value of the electric field intensity can be calculated by measuring a voltage, an electric current, a charging time, and the like between the second electrode sections 5a2 and the control section 5b.

That is, the control section 5b calculates, according to the positions of the plurality of second electrode sections 5a2 and a change in electric field intensity in the plurality of second electrode sections 5a2, the position where the disturbance of the electric field occurs, calculates at least one of a position, a moving direction, and speed of the detection target according to the calculated position where the disturbance of the electric field occurs, and converts a calculated value into an electric signal.

The control section 5b calculates the distance between the vehicle interior lighting device 1 and the detection target according to the value of the electric field intensity in the second electrode sections 5a2 and converts a calculated value into an electric signal.

Note that, as explained above, when the electric field changes, the capacitance also changes. Therefore, it is also possible to use the change in the capacitance instead of the change in the electric field intensity.

The value of the capacitance can be calculated by measuring the voltage, the electric current, the charging time, and the like between the second electrode sections 5a2 and the control section 5b.

Therefore, the control section 5b can calculate at least any one of the position, the moving direction, and the speed of the detection target according to the positions of the plurality of second electrode sections 5a2 and a change in a value of capacitance in the plurality of second electrode sections 5a2 and convert a calculated value into an electric signal.

In the case of the above illustration, the control section 5b can include an AC power supply that generates a low-frequency AC voltage and a measuring device that measures at least any one of a voltage, an electric current, and a charging time.

Note that in the case of the above illustration, the control section 5b applies the low-frequency AC voltage to the first electrode section 5a1 and the second electrode sections 5a2. However, the control section 5b can also apply a DC voltage to at least one of the first electrode section 5a1 and the second electrode sections 5a2.

In this case, the control section 5b can include a DC power supply that generates a DC voltage and a measuring device that measures at least one of a voltage, an electric current, and a charging time.

In the following explanation, as an example, the first electrode section 5a1 is connected to the ground and the control section 5b applies a plus or minus DC voltage to the second electrode sections 5a2.

Figure 7:
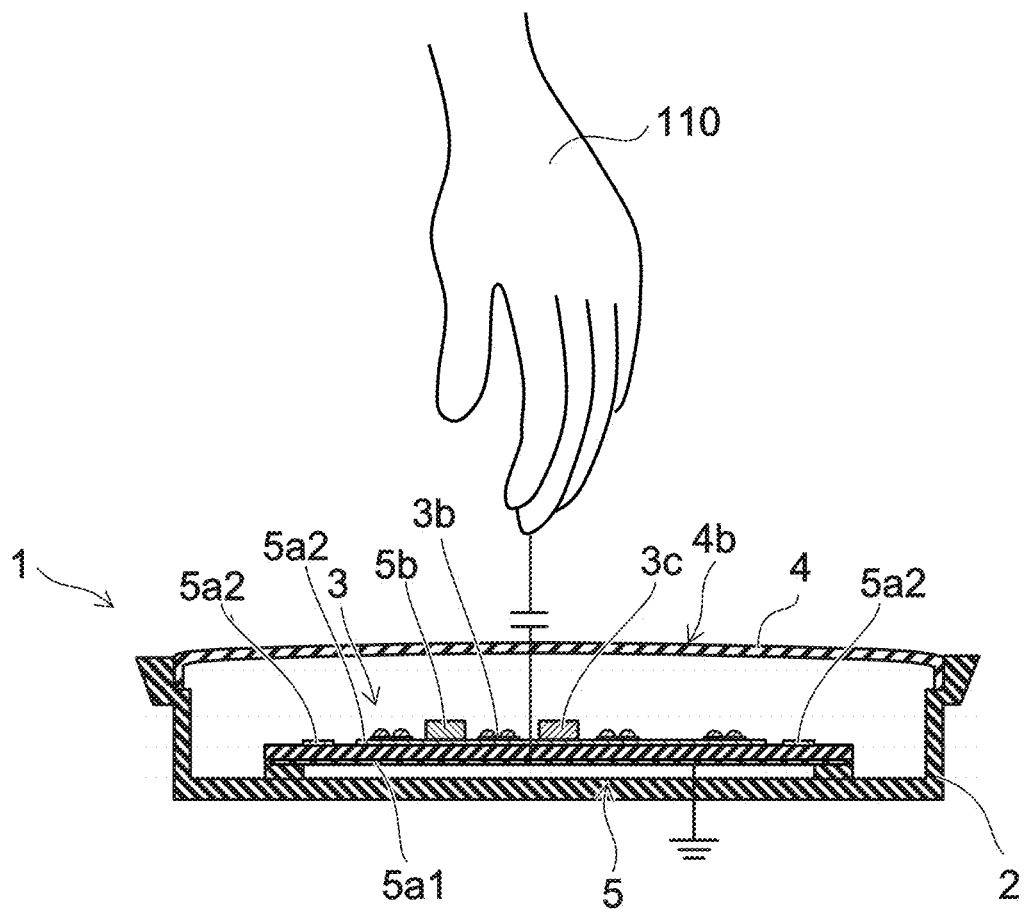
FIG. 7 is a schematic diagram for illustrating action of the detecting section.

FIG. 7 is a schematic diagram for illustrating action of the detecting section 5.

First, the control section 5b applies a plus or minus DC voltage to the second electrode sections 5a2.

Then, the second electrode sections 5a2 are charged to predetermined potential.

Subsequently, when the hand 110 or the like of the operator approaches the cover 4 (the second electrode sections 5a2), capacitance is generated between the hand 110 or the like of the operator connected to the ground and the second electrode section 5a2. In this case, a value of the capacitance increases as the distance between the hand 110 or the like of the operator and the cover 4 (the second electrode sections 5a2) decreases.

Note that the capacitance generated between the hand 110 or the like of the operator and the cover 4 (the second electrode sections 5a2) is connected in parallel to the capacitance generated between the first electrode section 5a1 and the second electrode sections 5a2.

As explained above, the value of the capacitance can be calculated by measuring the voltage, the electric current, the charging time, and the like between the second electrode sections 5a2 and the control section 5b.

Therefore, the control section 5b can calculate, on the basis of the calculated value of the capacitance, the position of the hand 110 or the like of the operator, the distance between the vehicle interior lighting device 1 and the hand 110 or the like, the moving direction, the speed, and the like of the hand 110 or the like.

That is, the detecting section 5 (the control section 5b) detects a change in the capacitance involved in a motion of the operator and converts the detected change in the capacitance into an electric signal.

Subsequently, the control section 5b sends information concerning the position of the hand 110 or the like and the moving direction, the moving speed, and the like of the hand 110 or the like to the control section 3c.

The control section 3c performs the control explained above on the basis of the electric signal from the detecting section 5 (the control section 5b).

Figure 8A:
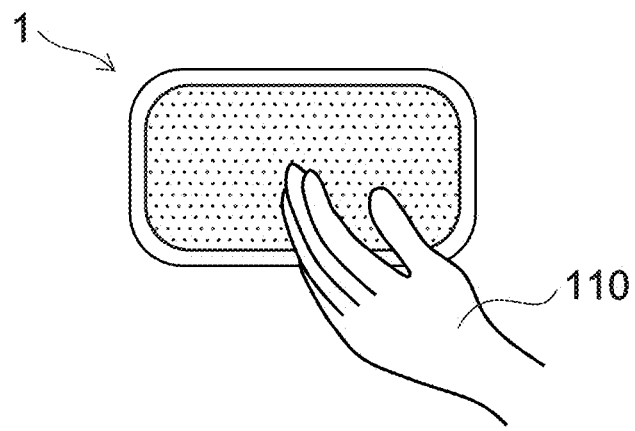
FIGS. 8A to 8C are schematic diagrams for illustrating control by a control section.
Figure 8B:
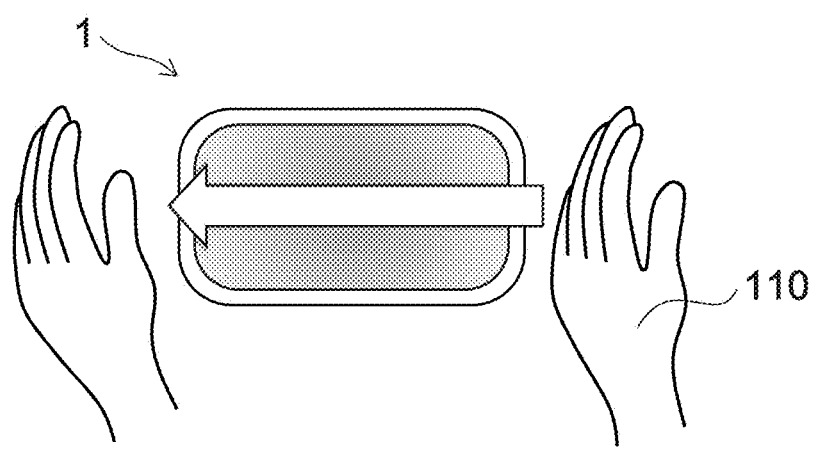
Figure 8C:
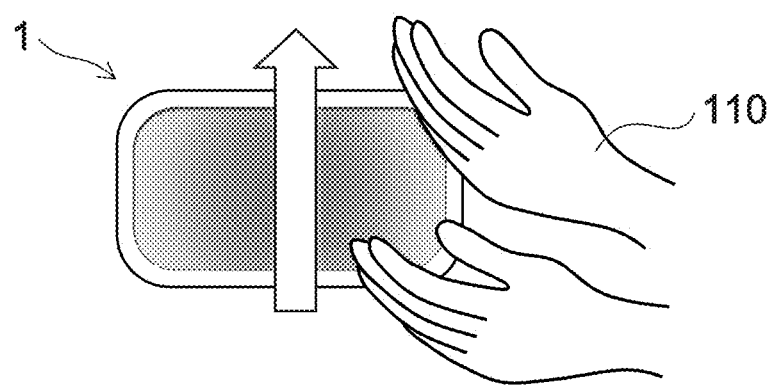

FIGS. 8A to 8C are schematic diagrams for illustrating the control by the control section 3c.

For example, as shown in FIG. 8A, it is possible to switch lighting and extinction of the light source 3b by bringing the hand 110 close to the center of the vehicle interior lighting device 1.

In this case, in order to avoid a malfunction, the control section 3c can start the control of the light source 3b when the distance between the vehicle interior lighting device 1 and the hand 110 or the like decreases to a predetermined value or less.

As explained above, the distance between the vehicle interior lighting device 1 and the hand 110 or the like can be calculated according to a value of electric field intensity and a value of capacitance. In this case, if the distance between the vehicle interior lighting device 1 and the hand 110 or the like decreases, the value of the electric field intensity increases (the value of the capacitance increases).

That is, if the distance between the vehicle interior lighting device 1 and the detection target decreases, the value of the electric signal increases.

Therefore, when the value of the electric signal from the detecting section 5 exceeds a predetermined value, the control section 3c can start the control of the light source 3b.

For example, the control section 3c can light the light source 3b when the hand 110 is brought into contact with the center of the vehicle interior lighting device 1 and extinguish the light source 3b when the hand 110 is brought into contact with the center of the vehicle interior lighting device 1 again.

Note that, when one second electrode section 5a2 is provided, for example, the control section 3c can perform only the switching of the lighting and the extinction of the light source 3b.

As shown in FIG. 8B, when the hand 110 or the like moves in a longitudinal direction above the vehicle interior lighting device 1, the control section 3c can control the light source 3b to change a color of light radiated from the vehicle interior lighting device 1.

In this case, for example, the control section 3c can control the light source 3b such that light having a light bulb color is radiated when the hand 110 or the like is present on one end portion side in the longitudinal direction of the vehicle interior lighting device 1, white light is radiated when the hand 110 or the like is present on the other end portion side in the longitudinal direction, and light having a color between the light bulb color and the white is radiated when the hand 110 or the like is present in the middle in the longitudinal direction.

As shown in FIG. 8C, when the hand 110 or the like moves in a latitudinal direction above the vehicle interior lighting device 1, the control section 3c can control the light source 3b to change the brightness of the light radiated from the vehicle interior lighting device 1.

In this case, for example, the control section 3c can control the light source 3b to reduce the brightness of the light when the hand 110 or the like is present on one end portion side in the latitudinal direction of the vehicle interior lighting device 1, increase the brightness of the light when the hand 110 or the like is present on the other end portion side in the latitudinal direction, and set the brightness of the light to intermediate brightness when the hand 110 or the like is present in the middle in the latitudinal direction.

Note that the control by the control section 3c is not limited to the control explained above.

The control section 3c can perform desired control on the light source 3b by combining the position, the moving direction, the moving speed, and the like of the hand 110 as appropriate.

For example, when the hand 110 or the like moves in an L-shape from the longitudinal direction to the latitudinal direction above the vehicle interior lighting device 1, the control section 3c can switch the light source 3b to the DOOR mode. For example, when the hand 110 or the like moves in an L-shape from the latitudinal direction to the longitudinal direction above the vehicle interior lighting device 1, the control section 3c can control the light source 3b to change a lighting pattern.

Figure 9:
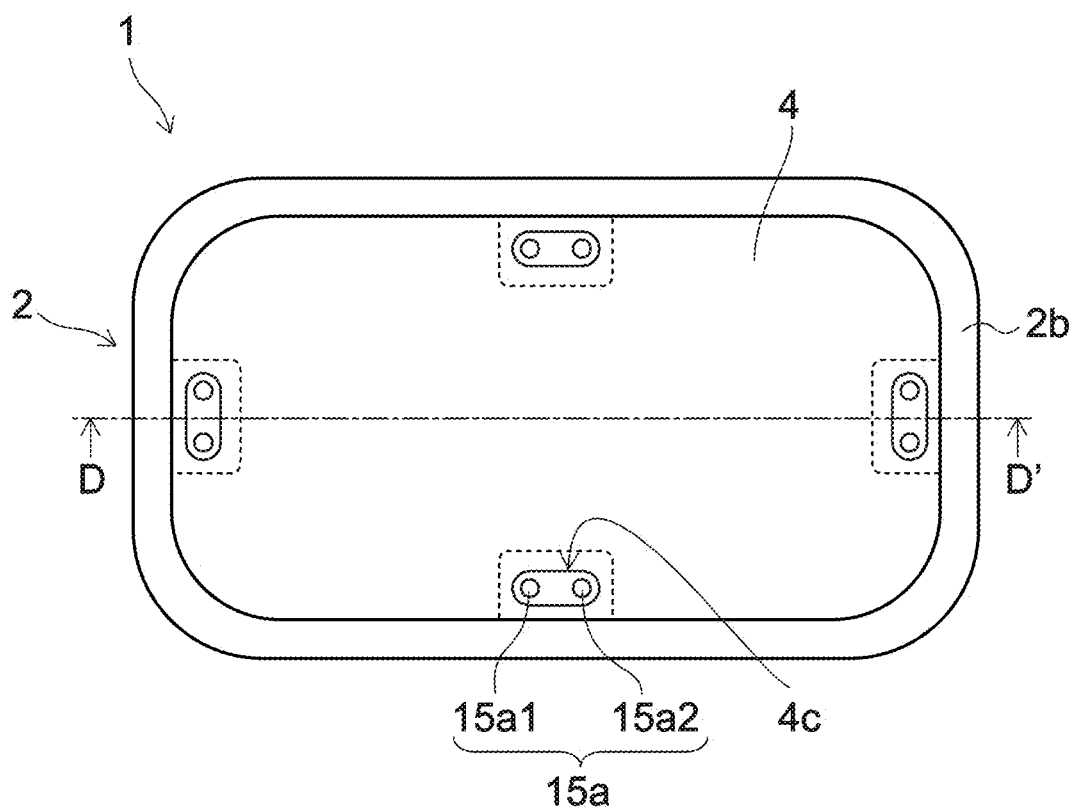
FIG. 9 is a schematic plan view for illustrating a detecting section according to another embodiment.

FIG. 9 is a schematic plan view for illustrating a detecting section 15 according to another embodiment.

Figure 10:
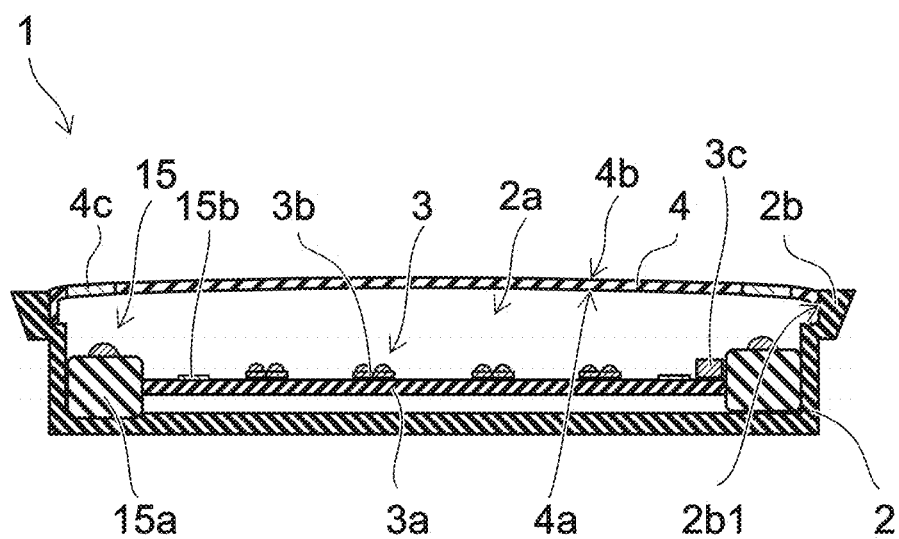
FIG. 10 is a schematic sectional view for illustrating the detecting section.

FIG. 10 is a schematic sectional view for illustrating the detecting section 15.

Note that FIG. 10 is a schematic sectional view in a D-D' line direction in FIG. 9.

The detecting section 15 detects, for example, a movement of the hand 110 or the like of the operator near the vehicle interior lighting device 1.

The detecting section 15 emits energy (light) functioning as a detection medium via the cover 4, detects a change in the energy (a change in the intensity of the light) involved in a motion of the operator, converts the detected change in the energy (change in the intensity of the light) into an electric signal, and sends the electric signal to the control section 3c.

The detecting section 5 illustrated in FIG. 6 detects the hand 110 or the like using the electric field 100. However, the detecting section 15 detects the hand 110 or the like using light.

As shown in FIGS. 9 and 10, the detecting section 15 is provided on the inside of the housing 2. The detecting section 15 is not exposed to the radiation surface 4b of the cover 4.

In the detecting section 15, a light projecting and receiving section 15a and a control section 15b are provided.

In the light projecting and receiving section 15a, a light-projecting section 15a1 that radiates light via the cover 4 and a light-receiving section 15a2 that converts the light reflected according to a motion of the operator into an electric signal are provided. The light-projecting section 15a1 can be, for example, a light-emitting diode. The light-receiving section 15a2 can be, for example, a photoelectric conversion element.

If the light radiated from the light-projecting section 15a1 is a visible ray, it is likely that a tint of light radiated from the light source 3b changes. If the light-receiving section 15a2 detects the visible ray, it is likely that the light-receiving section 15a2 malfunctions.

Therefore, the light-projecting section 15a1 and the light-receiving section 15a2 desirably use an invisible ray.

In the following explanation, as an example, the light-projecting section 15a1 and the light-receiving section 15a2 use an infrared ray.

The number of light projecting and receiving sections 15a can be set to two or more.

If the number of light projecting and receiving sections 15a is set large, it is possible to detect details of a motion of the operator. However, if the dimension among the light projecting and receiving sections 15a is too short, erroneous detection is caused.

Therefore, it is desirable to set the number, the disposition, and the like of the light projecting and receiving sections 15a taking into account the size of the vehicle interior lighting device 1.

The control section 15b is electrically connected to the light projecting and receiving section 15a. When the plurality of light projecting and receiving sections 15a are provided, the plurality of light projecting and receiving sections 15a are connected in parallel.

A light transmitting section 4c can be provided in the cover 4. The light transmitting section 4c transmits an infrared ray radiated from the light-projecting section 15a1 and the infrared ray reflected by the hand 110 or the like. The light transmitting section 4c is provided in a position overlapping the light-projecting section 15a1 and the light-receiving section 15a2 in plan view. The light transmitting section 4c is opposed to the light-projecting section 15a1 and the light-receiving section 15a2.

The light transmitting section 4c can be formed of, for example, a transparent material or can be a hole provided in the cover 4.

Note that the light transmitting section 4c may assume a frame shape and may be provided along the circumferential edge of the cover 4.

Figure 11:
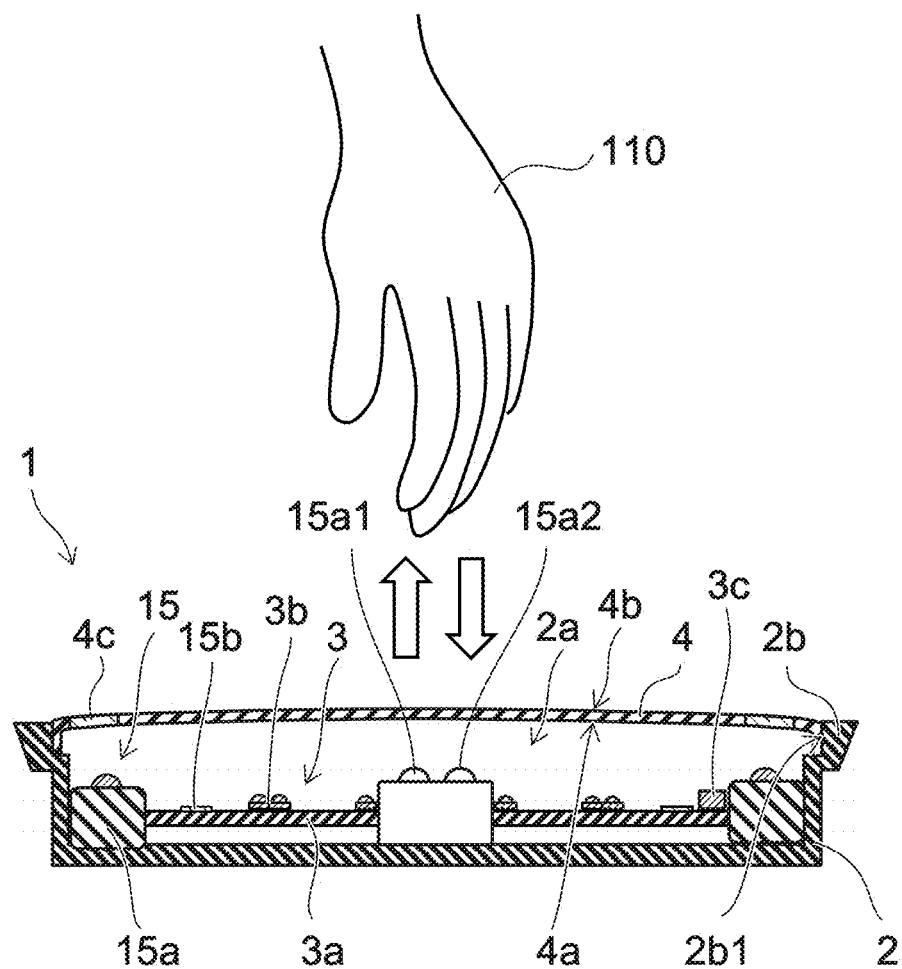
FIG. 11 is a schematic diagram for illustrating action of the detecting section.

FIG. 11 is a schematic diagram for illustrating action of the detecting section 15.

As shown in FIG. 11, the control section 15b causes the light-projecting section 15a1 to radiate an infrared ray. The radiated infrared ray is radiated to the outside of the vehicle interior lighting device 1 via the light transmitting section 4c.

When the infrared ray radiated to the outside of the vehicle interior lighting device 1 is made incident on the hand 110 or the like of the operator, the incident infrared ray is reflected by the hand 110 or the like. The reflected infrared ray is led into the inside of the vehicle interior lighting device 1 via the light transmitting section 4c and made incident on the light-receiving section 15a2.

Therefore, the position of the hand 110 or the like in a direction parallel to the radiation surface 4b can be calculated from the position of the light-receiving section 15a2 on which the reflected infrared ray is made incident. In this case, the control section 15b can also calculate the distance between the vehicle interior lighting device 1 and the hand 110 or the like (the position of the hand 110 or the like in the direction perpendicular to the radiation surface 4b) and the moving direction, the speed, and the like of the hand 110 or the like.

Note that the distance between the vehicle interior lighting device 1 and the hand 110 or the like can be calculated according to an output value from the light-receiving section 15a2. The moving direction, the speed, and the like of the hand 110 or the like can also be calculated according to the position of the light-receiving section 15a2 and the output value from the light-receiving section 15a2.

Subsequently, the control section 15b sends information concerning the position of the hand 110 or the like and the moving direction, the moving speed, and the like of the hand 110 or the like to the control section 3c.

The control section 3c performs the control explained above on the basis of the electric signal from the detecting section 15.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A vehicle interior lighting device comprising:
a housing;
a cover provided on one side of the housing;
a light-emitting section provided on an inside of the housing; and
a detecting section provided on the inside of the housing and configured to detect, via the over, a change in energy involved in a motion of an operator and convert the detected change in the energy into an electric signal,
the light-emitting section includes:
a substrate;
a light source provided on a surface on the cover side of the substrate; and
a first control section configured to control the light source on the basis of the electric signal, and
the detecting section includes:
a first electrode section provided on a surface on an opposite side of the cover side of the substrate;
a second electrode section provided on the surface on the cover side of the substrate; and
a second control section configured to apply a low-frequency AC voltage to the first electrode section and the second electrode section.

2. The device according to claim 1, wherein the detecting section is not exposed to a surface on an opposite side of the light-emitting section side of the cover.

3. The device according to claim 1, wherein
the change in the energy is a change in electric field intensity, and
the detecting section generates an electric field and converts a change in the electric field intensity involved in the motion of the operator in the electric field into the electric signal.

4. The device according to claim 1, wherein the first electrode section is provided near a peripheral edge of the substrate.

5. The device according to claim 1, wherein the first electrode section assumes a frame shape.

6. The device according to claim 1, wherein a width dimension of the first electrode section is longer than a width dimension of the second electrode section.

7. The device according to claim 1, wherein the second electrode section is provided near a peripheral edge of the substrate.

8. The device according to claim 1, wherein a plurality of the second electrode sections are provided.

9. The device according to claim 1, wherein
a plane shape of the substrate is a square shape, and
a singularity of the second electrode section is provided near each of sides of the substrate.

10. The device according to claim 1, wherein the second control section calculates, according to a position of the second electrode section and a change in electric field intensity in the second electrode section, a position where a disturbance of the electric field occurs, calculates, according to the calculated position where the disturbance of the electric field occurs, at least any one of a position, a moving direction, and speed of a detection target, and converts a calculated value into the electric signal.

11. The device according to claim 10, wherein the detection target is a hand of the operator.

12. The device according to claim 1, wherein the second control section calculates, according to a value of electric field intensity in the second electrode section, a distance between the vehicle interior lighting device and a detection target and converts a calculated value into the electric signal.

13. The device according to claim 12, wherein, if the distance between the vehicle interior lighting device and the detection target decreases, a value of the electric signal increases.

14. The device according to claim 12, wherein the first control section starts the control of the light source when the value of the electric signal exceeds a predetermined value.

15. The device according to claim 14, wherein the control of the light source is at least any one of lighting of the light source, extinction of the light source, dimming of the light source, toning of the light source, a change in a lighting pattern of the light source, and switching of a lighting mode of the light source.

* * * * *